Jan. 18, 1944.        A. C. SMITH        2,339,720
GAUGE
Filed May 29, 1942
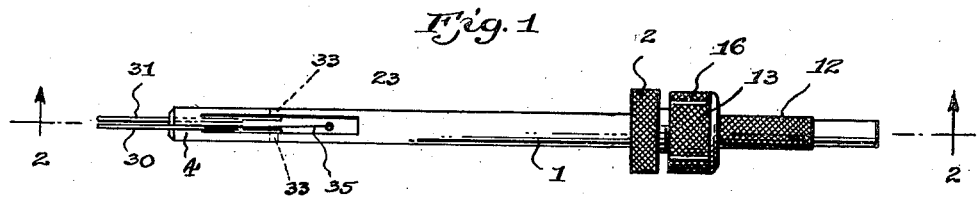
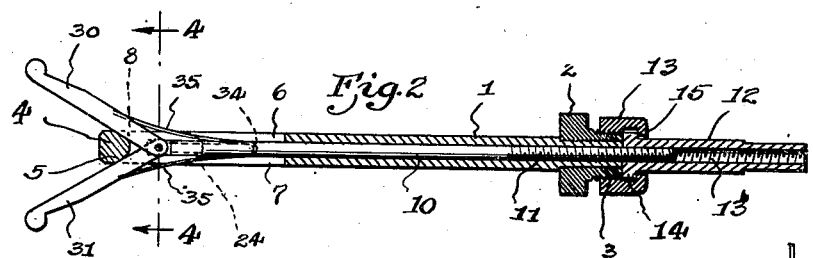
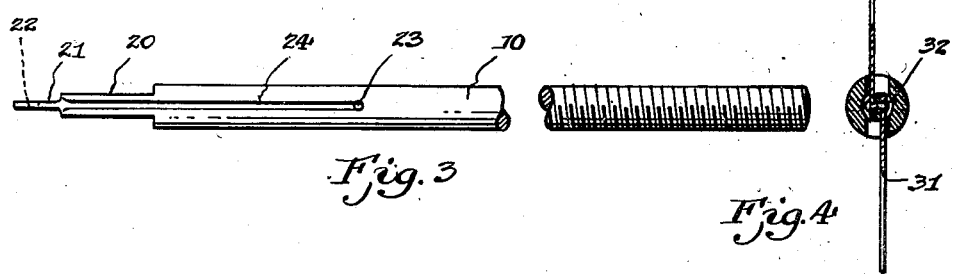
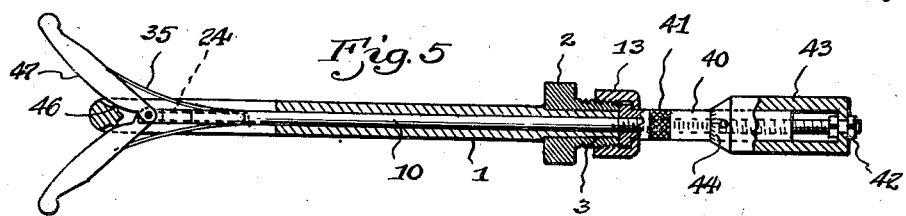
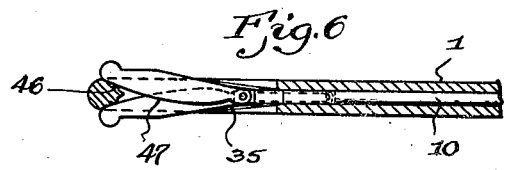
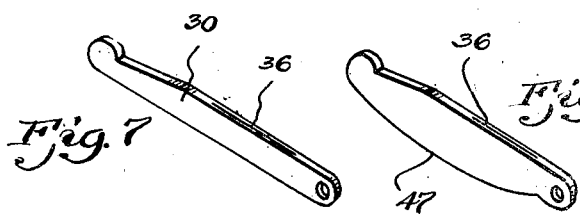
INVENTOR.
Arthur C. Smith
BY
Barnes, Kisselle, Laughlin & Raisch
Attorneys.

Patented Jan. 18, 1944

2,339,720

UNITED STATES PATENT OFFICE 2,339,720

GAUGE

Arthur C. Smith, Detroit, Mich.

Application May 29, 1942, Serial No. 444,969

2 Claims. (Cl. 33—164)

This invention relates to a gauge and has to do particularly with an instrument for obtaining accurate measurements of such things as machine and tool parts. The dimension or diameter of curved bodies may be obtained by the instrument and thus the gauge may be termed a caliper gauge.

Among the objects of the invention is the provision of a gauge embodying improvements in construction and in the manner of use and results obtained thereby. The objects include the provision of a gauge having a relatively large range of adjustment to the end that one tool may be used throughout a range where several tools were heretofore required.

It is an aim of the invention to provide a tool which is positively adjustable and which can be then locked in position at any desired adjustment and such adjustment will be maintained even though the tool be subjected to rough handling. To this end the tool is adjustable by a turning movement and once the adjustment is obtained a secure locking arrangement is provided.

A further object of the invention is to provide a tool capable of use with a wide variety of work pieces; for example, the tool can be employed to gauge the dimension of a shallow groove and, due to its construction, it gives a better feel to the user, particularly where the diameter of a small, relatively deep hole is gauged.

A still further object of the invention is to provide a gauge having a screw thread adjustment and which embodies a pivotal action for the gauging arms together with a construction so that the adjustment of the arms is in equal increments for each revolution of the screw thread adjustment. With this arrangement a device embodying a readable scale, such as a micrometer, may be employed in the instrument so that the dimension of the adjustment can be immediately read and ascertained.

A gauge for carrying out the invention is disclosed in the accompanying drawing and this instrument is one of a type for gauging inside dimensions. In this drawing:

Fig. 1 is a side elevational view of the gauge.

Fig. 2 is a cross-sectional view taken substantially on line 2—2 of Fig. 1 showing the gauge adjusted to a position for gauging a dimension of considerable proportions.

Fig. 3 is an elevational view of the adjusting rod.

Fig. 4 is an enlarged cross-sectional view taken substantially on line 4—4 of Fig. 2.

Fig. 5 is a view showing a modified form where the gauge includes a micrometer so that the dimension measured can be ascertained.

Fig. 6 is a cross-sectional view of one end of the modified form illustrating the gauging fingers or arms in retracted position.

Fig. 7 is a perspective view of a gauging arm for the type of gauge shown in Figs. 1 and 2.

Fig. 8 is a perspective view of an arm for the type of gauge shown in Figs. 5 and 6.

By referring to Figs. 1 and 2 it will be observed that the gauge comprises a body 1 of elongated tubular form having an enlargement or head 2, the surface of which may advantageously be knurled, as shown, and a screw threaded end 3. The opposite end of this tubular body is closed and it has what may be termed an anvil or separator at 4 with inclined surfaces 5 which diverge toward the extreme end of the body. Inwardly of the anvil the tubular wall is provided with opposite elongated slots 6 and 7 which may have narrow end extensions 8. This tubular body may be of a single piece of metal or it may be fabricated from several pieces suitably assembled together.

Slidably disposed within the tubular body, preferably with an accurate, snug fit, is a bar or rod 10 having one end provided with screw threads as at 11. The screw threaded end projects beyond the end of the body 1 and it is engaged by nut or adjusting member 12 having internal threads 13. This member has a collar 14 arranged to abut the end of the body 1. A locking nut 15 has a threaded engagement with the end 3 of the body, a central aperture through which the adjusting member 12 extends and a flange 15 defining the central aperture and overlying the collar 14. It will be seen that by turning the adjusting member or nut 12 that the rod 10 may be shifted with longitudinal movement relative to the body, inasmuch as the adjusting nut is held from longitudinal movement by its collar 14 and the rod is held against rotation as will presently be seen. The nut 13 advantageously has a knurled surface and it may be turned so that the collar 14 is clamped between the flange 15 and the end of the tubular body to lock the adjusting nut 12 against further movement. The wall of the lock nut 13 may be slotted as at 16 in order to provide a measure of yieldability so as to frictionally engage the threaded extension 3 to aid in maintaining its locked position.

At the opposite end the bar may be cut away on opposite sides to form a narrow extension 20 and the extreme end thereof may be further reduced to provide a narrow end portion 21 provided with a transverse aperture 22 therein. Another aperture 23 passes through the rod in an intermediate portion thereof and the rod has a groove 24 on each side thereof extending from the aperture 23 to a position adjacent the end 22.

A pair of gauging arms 30 and 31 are pivotally secured to the end portion 22 as by means of a pin 32 and for assembly purposes the tubular body is provided with opposite apertures 33. This permits, in the assembling operation, of positioning the gauging arms and then passing the pin 32 through one of the apertures 33 and it may be engaged by tools entering the opposite apertures 33 to rivet the ends thereof. The arms lie slidably in narrow slots or extensions 8 of the slots 6 and 7, and thus hold the rod against rotation.

Spring means act upon the arms 30 and 31 to hold them in engagement with the surfaces of the anvil. This comprises a single length of spring wire bent upon itself to form a bight portion 34 which lies in the aperture 23 and two legs 35 which engage the gauging arms in slots provided in their edges, as shown at 36. The legs 35 extend parallel to the grooves 24 so that when the rod 10 is retracted the legs of the spring lie within the grooves 24 and can, therefore, pass into the tubular body 1.

In the operation of this instrument the lock nut 13 will, of course, be loosened slightly to permit of the turning of the adjusting nut 12. As the nut is turned to advance the rod 10 to the right, as Fig. 2 is viewed, the spring legs 35 serve to swing the gauging arms 30 and 31 around their pivot to collapse the same. As the adjusting nut 12 is turned to advance the rod 10 to the left, the pivot point 32 shifts toward the anvil 4 and the arms 30 and 31 are caused to turn on the pivot outwardly away from each other against the action of the spring. When the bar 10 is shifted to the right to its extreme position, the gauging arms may lie side by side and the entire construction is substantially within the exterior contour of the body 1. After this gauge has been adjusted to the dimension of any suitable piece of work, which is measured by the distance across the ends of the arms 30 and 31, this dimension may then be ascertained by measuring the distance with a suitable instrument such as a micrometer. The thinness of the gauging arms 30 and 31, which are preferably made of tool steel, facilitates the measuring of a groove having a very shallow depth. Moreover, when the tool is used to gauge a small diameter hole the thinness of the gauging arms permits of a rocking action of the tool by the operator in making the adjustment so that a proper feel is provided.

In the modified form shown in Figs. 5 and 6 a reading instrument in the nature of a micrometer is provided in combination with the gauge. The basic construction is essentially the same except for that described below and the same reference characters are applied to like parts. In this form, the adjusting nut 40 has a knurled portion 41 by means of which it may be turned and the bar 10 extends outwardly beyond the end of the nut 40 where it is non-rotatably secured as at 42 to a thimble 43. The thimble and the adjusting member 40 have cooperating indicia 44 and thus constitute, in effect, a micrometer. In making the adjustment, the thimble is the non-rotatable element and the adjusting member 40 is the rotatable element. Where, however, the tool is to be employed with this micrometer reading arrangement, means must be provided so that for each revolution of the adjusting member there will be equal increments of adjustment of the gauging arms. This is not necessarily true of the form shown in Figs. 1 and 2 since the arms are gauged after an adjustment is made. Due to the fact that the pivot point 32 moves toward and away from the anvil, one revolution of the adjusting member will normally provide a greater increment of adjustment when the pivotal connection is relatively near the anvil than when the pivotal connection is relatively removed from the anvil.

In the form shown in Figs. 5 and 6, however, the anvil is constructed to provide an accurately located fulcrum point 46 for each arm and each arm, instead of having a straight surface for engaging the fulcrum point, has a calculated curved surface 47. This curved surface is not on a radius and may be originally obtained imperically. The curve is such that it falls away, so to speak, particularly near the pivoted ends of the arms as indicated at the point X (Fig. 8) so that as the point 32 approaches the fulcrums 46, with a natural tendency to progressively increase the increments of adjustment of the arms for each revolution, this falling away or cut back formation compensates for this tendency to provide equal increments of adjustment per revolution throughout the entire range of adjustment. Accordingly, the micrometer gives an accurate reading of any adjustment.

I claim:

1. A gauge, comprising an elongated tubular body, a rod slidably mounted in the body, screw thread means including a rotatable adjusting member for adjusting the body and rod axially relative to each other, said body member adjacent one end having oppositely disposed elongated slots, a separator member on the body at the slotted end thereof, a pair of gauging arms extending out through the slots, means pivotally mounting the gauging arms to the rod, said rod having an aperture extending therethrough spaced from the pivotal mounting, a spring of U-shape having its bight portion anchored in the aperture and having its legs engaging the two arms to hold the arms yieldably against the separator member whereby the angularity of the arms and the distance between their gauging portions varies as the rod and body member are relatively adjusted axially and grooves in the rod extending from the anchoring aperture for accommodating the legs of the spring as the same is retracted into the tubular body.

2. A gauge, comprising an elongated tubular body, a rod having screw threads thereon slidably positioned within the body, a rotatable adjusting member having internal screw threads engaging the threads of the rod, means for holding the adjusting member against axial movement relative to the body and for clamping the rotatable adjustable member to the body member, a pair of gauging arms pivotally mounted to the rod, and a separator member carried by the body and positioned between and arranged to be engaged by the arms whereby to vary the relative angularity of the arms and distance between their gauging portions as the pivotal mounting shifts toward and away from the separator.

ARTHUR C. SMITH.